United States Patent
Cha et al.

(10) Patent No.: US 10,091,341 B1
(45) Date of Patent: Oct. 2, 2018

(54) DISPLAY PROTECTOR ATTACHING APPARATUS FOR SMART DEVICE AND THE METHOD HAVING THE SAME

(71) Applicant: Whitestone Co., Ltd., Cheonan-si (KR)

(72) Inventors: Myong Jin Cha, Cheonan-si (KR); Jae-yong Jeong, Cheonan-si (KR); Jin Ho Seok, Anseong-si (KR); Han Sung Kim, Anseong-si (KR); Soongwon Lee, Cheonan-si (KR)

(73) Assignee: WHITESTONE CO., LTD., Seobuk-Gu, Cheonan-si (KR)

( * ) Notice: Subject to any disclaimer, the term of this patent is extended or adjusted under 35 U.S.C. 154(b) by 0 days.

(21) Appl. No.: 15/730,563

(22) Filed: Oct. 11, 2017

(30) Foreign Application Priority Data

Aug. 4, 2017 (KR) .................. 10-2017-0098792

(51) Int. Cl.
| | |
|---|---|
| *H04M 1/02* | (2006.01) |
| *B32B 37/12* | (2006.01) |
| *B29C 65/48* | (2006.01) |
| *H04N 9/31* | (2006.01) |
| *G03B 21/14* | (2006.01) |

(52) U.S. Cl.
CPC ........ *H04M 1/0272* (2013.01); *G03B 21/145* (2013.01); *H04N 9/3173* (2013.01)

(58) Field of Classification Search
CPC combination set(s) only.
See application file for complete search history.

(56) References Cited

U.S. PATENT DOCUMENTS

| | | | | |
|---|---|---|---|---|
| 9,616,652 | B2 * | 4/2017 | Wu | B32B 43/006 |
| 9,799,242 | B2 * | 10/2017 | Takashima | G09F 13/04 |
| 2003/0121601 | A1 * | 7/2003 | Tajima | G09F 7/18 |
| | | | | 156/254 |
| 2009/0229766 | A1 * | 9/2009 | Aveldson | B32B 43/006 |
| | | | | 156/759 |
| 2010/0149452 | A1 * | 6/2010 | Harada | G02F 1/1333 |
| | | | | 349/58 |

(Continued)

FOREIGN PATENT DOCUMENTS

| | | | | |
|---|---|---|---|---|
| KR | 10-1252750 | B1 | 4/2013 | |
| KR | 101252750 | B1 * | 4/2013 | ......... B29C 63/0004 |

OTHER PUBLICATIONS

Translation of KR 10-1252750.*

*Primary Examiner* — Nay A Maung
*Assistant Examiner* — Erica Fleming-Hall
(74) *Attorney, Agent, or Firm* — Heedong Chae; Lucem, PC

(57) ABSTRACT

Provided are a display protector attaching apparatus for a smart device and an attaching method thereof. The display protector attaching apparatus for the smart device of the present invention includes a base portion provided with a receiving groove in which a smart device is received; a cover portion coupled to the base portion to cover the smart device received in the receiving groove; and a lifting supporter detachably coupled to a coupler provided in the base portion to support one side of a display protector attached to the smart device, in which when the lifting supporter is separated from the coupler, the display protector is detached from the display of the smart device placed with a liquid adhesive member to be attached to the display.

7 Claims, 6 Drawing Sheets

(56) References Cited

U.S. PATENT DOCUMENTS

| | | | |
|---|---|---|---|
| 2013/0335669 A1* | 12/2013 | Chen | G02F 1/133308 |
| | | | 349/58 |
| 2014/0047708 A1* | 2/2014 | Chae | H04W 4/00 |
| | | | 29/700 |
| 2016/0009024 A1* | 1/2016 | Mason | B29C 63/02 |
| | | | 156/249 |
| 2017/0253014 A1* | 9/2017 | Kleeman | B32B 37/02 |
| 2017/0274635 A1* | 9/2017 | Lin | G06F 1/1626 |
| 2017/0297268 A1* | 10/2017 | Witham | B29C 65/48 |

* cited by examiner

DISPLAY PROTECTOR ATTACHING APPARATUS FOR SMART DEVICE AND THE METHOD HAVING THE SAME

CROSS-REFERENCE TO RELATED APPLICATION

This application claims the benefit of Korean Application No. 10-2017-0098792 filed on Aug. 4, 2017 with the Korean Intellectual Property Office, the disclosure of which is incorporated herein by reference.

TECHNICAL FIELD

The present invention relates to a display protector attaching apparatus for a smart device and an attaching method thereof, and more particularly, to a display protector attaching apparatus for a smart device and an attaching method thereof capable of easily and efficiently attaching a display protector to a display of a smart device using a liquid adhesive member.

BACKGROUND ART

In recent years, smart devices (Mobile/Tablet) are high-priced products and have a structure that protects a touch panel by applying a display unit, that is, a flat or 2.5D and 3D cover glasses on the front. Such a cover glass has a high risk of being damaged or broken due to physical shock or falling.

When the cover glass is damaged or broken, cost of about 30 to 40% of the smart device is required during repairing, and a lot of time of at least 2 hors to 2 days is taken for repairing. Also, the appearance is poor and the surface is sharp to cause floating and malfunctioning.

However, when the cover glass of the smart device is damaged or broken, due to the high repairing cost, the smart device is often used by abiding the above-mentioned inconveniences and risks, and a small damage such as scratches is often neglected.

Accordingly, improvements that general consumers can easily attach a protective glass or protective film to the display of the smart device are required.

The above-described technical structure is a background technique for helping in understanding of the present invention, and does not refer to conventional techniques widely known in the art to which the present invention belongs.

PRIOR ART DOCUMENT

Patent Document

Korean Patent Registration No. 10-1252750 (Applicant: Dastec Co., Ltd.) (Date of Registration: Apr. 3, 2013)

DISCLOSURE

Technical Problem

The present invention has been made in an effort to a display protector attaching apparatus for a smart device and an attaching method capable of easily and efficiently attaching a display protector to a display of a smart device using a liquid adhesive member.

Technical Solution

An exemplary embodiment of the present invention provides a display protector attaching apparatus for the smart device including: a base portion provided with a receiving groove in which a smart device is received; a cover portion coupled to the base portion to cover the smart device received in the receiving groove; and a lifting supporter detachably coupled to a coupler provided in the base portion to support one side of a display protector attached to the smart device, in which when the lifting supporter is separated from the coupler, the display protector is detached from the display of the smart device placed with a liquid adhesive member to be attached to the display.

The base portion may include a base body provided with the receiving groove; and the coupler provided at one side of the base body and detachably coupled with the lifting supporter.

A stepped groove on which the cover portion is seated may be provided on the upper surface of the base body.

The cover portion may include a cover body detachably coupled to the upper surface of the base body and provided with an opening hole at the center; and an edge portion provided to protrude upwardly from the edge of the opening hole, in which the edge portion may have a cutting portion guiding one side of the lifting supporter coupled to the coupler to enter the opening hole.

The lifting supporter may include a lifting support body detachably coupled to the coupler; and a stopper provided in the lifting support body to restrict a moving distance of the lifting support body.

The lifting supporter may further include a handle provided in the lifting support body.

The display protector attaching apparatus may further include an adhesive member injection portion detachably coupled to the base portion to inject the liquid adhesive member to the display of the smart device received in the receiving groove.

Another exemplary embodiment of the present invention provides an attaching method of a display protector for a smart device including: seating a smart device in a receiving groove of a base portion provided with the receiving groove; dropping a liquid adhesive member on a display of the smart device; and attaching the display protector to the display by separating a lifting supporter detachably coupled to a coupler of the base portion to support one side of the display protector from the coupler.

Advantageous Effects

According to the exemplary embodiments of the present invention, when a lifting supporter is separated from a coupler, the display protector is detached from the display for the smart device placed with a liquid adhesive member to be attached to the display, thereby easily and stably attaching the display protector.

MODES OF THE INVENTION

Figure 1:
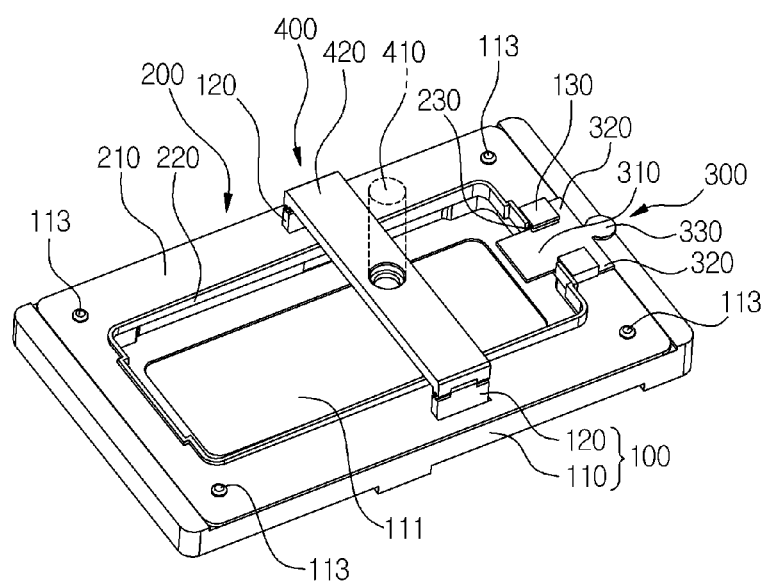
FIG. 1 is a diagram schematically illustrating a display protector attaching apparatus for a smart device according to an exemplary embodiment of the present invention.

In order to fully understand the present invention, operational advantages of the present invention and objects achieved by implementing the present invention, the prevent invention will be described with reference to the accompanying drawings which illustrate preferred embodiments of the present invention and the contents illustrated in the accompanying drawings.

Hereinafter, preferred exemplary embodiments of the present invention will be described in detail with reference to the accompanying drawings. Like reference numerals illustrated in the respective drawings designate like members.

In the present exemplary embodiment, a smart device includes a smart phone or a tablet, and a display protector may include a protective glass or a protective film.

Figure 2:
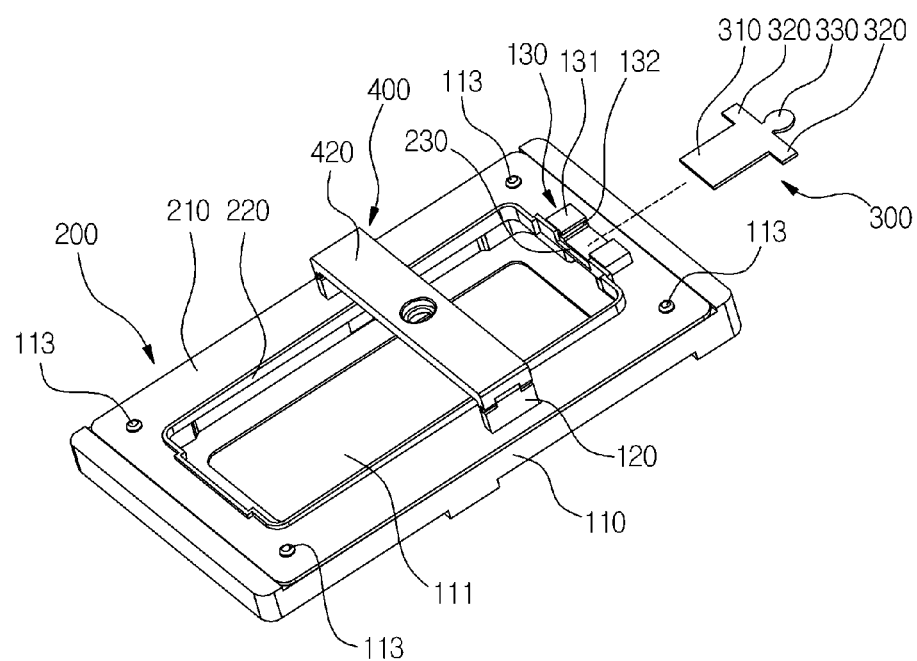
FIG. 2 is a diagram illustrating that a lifting supporter is separated in FIG. 1.
Figure 3:
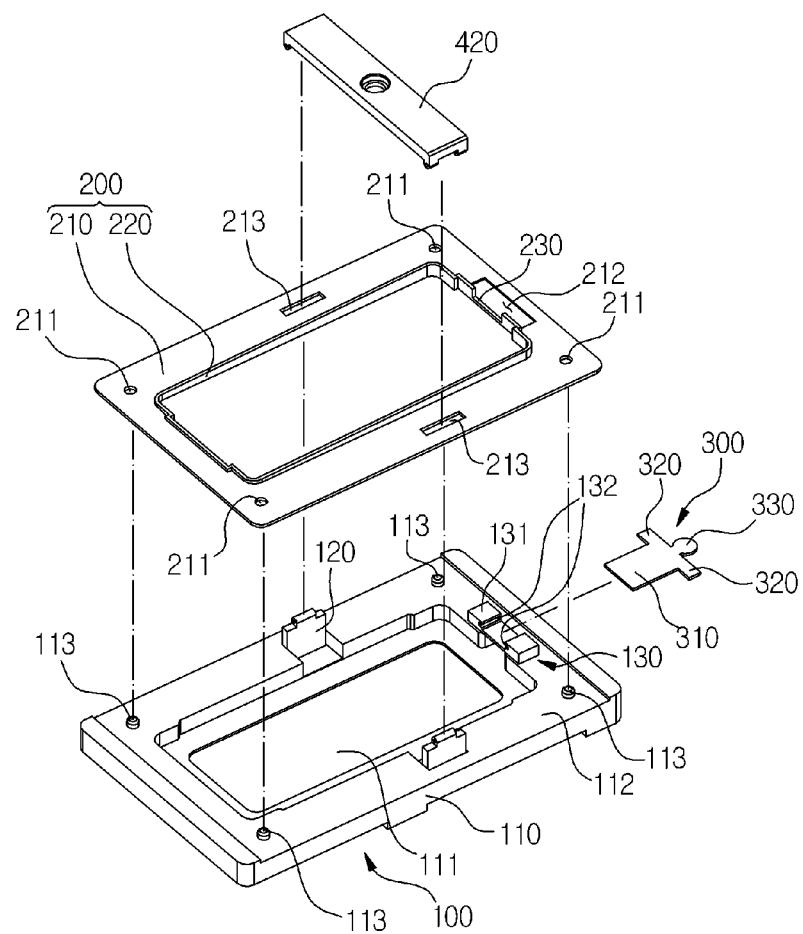
FIG. 3 is an exploded perspective view of FIG. 1.

FIG. 1 is a diagram schematically illustrating a display protector attaching apparatus for a smart device according to an exemplary embodiment of the present invention, FIG. 2 is a diagram illustrating that a lifting supporter is separated in FIG. 1, and FIG. 3 is an exploded perspective view of FIG. 1.

As illustrated in the drawings, a display protector attaching apparatus 1 for a smart device according to the exemplary embodiment includes a base portion 100 provided with a receiving groove 111 in which a smart device S is received, a cover portion 200 coupled to the base portion 100, a lifting supporter 300 detachably coupled to a coupler 130 provided in the base portion 100 to support one side of a display protector P attached to the smart device S, and an adhesive member injection portion 400 detachably coupled to the base portion 100 to inject a liquid adhesive member to the display of the smart device S received in the receiving groove 111.

Figure 4:
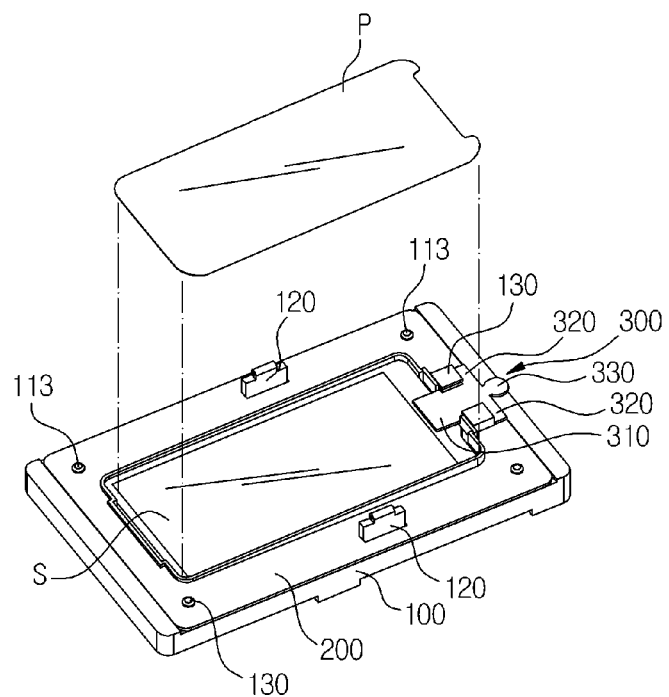
FIG. 4 is a diagram illustrating a state before a display protector is supported by the lifting supporter as a used state in Example.

The base portion 100 is provided as a place where the smart device S is stably received as illustrated in FIG. 4 and includes a base body 110 provided with the receiving groove 111, a pair of embossed portions 120 spaced apart from an upper side of the base body 110, and a coupler 130 provided at one side of the base body 110 and provided as a detachably coupling place of the lifting supporter 300 as illustrated in FIG. 3.

As illustrated in FIG. 3, the base body 110 of the base portion 100 may have a flat hexahedral shape elongated in a lateral direction and the receiving groove 111 in which the smart device S is received may be provided in an area except for edges.

In the exemplary embodiment, as illustrated in FIG. 3, a stepped groove 112 and a coupling embossed portion 113 may be provided on the upper surface of the base body 110. In the exemplary embodiment, as illustrated in FIG. 1, a cover body 210 may be received in the stepped groove 112 and the cover body 210 provided with a coupling groove 211 may be coupled and fixed to the coupling embossed portion 113.

As illustrated in FIG. 1, an end portion of a bushing 420 may be detachably fitted to the pair of embossed portions 120 of the base portion 100.

In the exemplary embodiment, the pair of embossed portions 120 may also be provided in a depressed shape depressed downwardly of the base body 110, instead of a protruded shape illustrated in FIG. 3.

As illustrated in FIG. 3, the coupler 130 of the base portion 100 may be provided at one longitudinal edge of the base body 110 and may be provided as a detachably coupling place of the lifting supporter 300.

In the exemplary embodiment, as illustrated in FIG. 3, the coupler 130 includes a coupling body 131 provided on the upper surface of the stepped groove 112 and with a cut central portion, and a coupling groove 132 provided at the cut central portion of the coupling body 131.

In the exemplary embodiment, the lifting supporter 300 may be detachably fitted to the coupling groove 132.

The cover portion 200 is coupled to the stepped groove 112 of the base body 110 illustrated in FIG. 3 to cover an upper area of the base body 110.

In the exemplary embodiment, as illustrated in FIG. 3, the cover portion 200 includes a cover body 210 having a shape corresponding to the base body 110 and an opened central portion, an edge portion 220 provided to protrude upwardly from the opened central portion of the cover body 210 and provided as a moving path of a lifting support body 310.

As illustrated in FIG. 3, in the cover body 210 of the cover portion 200, a plurality of coupling holes 211, a coupler through hole 212, and a plurality of embossed through holes 213 are provided.

In the exemplary embodiment, the plurality of coupling holes 211 is coupled to the plurality of embossed through holes 213, the coupler 130 penetrates into the coupler through hole 212, and the plurality of embossed portions 120 penetrates into the plurality of embossed through holes 213, and as a result, the cover body 210 is supported to stably maintain the coupled position.

Figure 5:
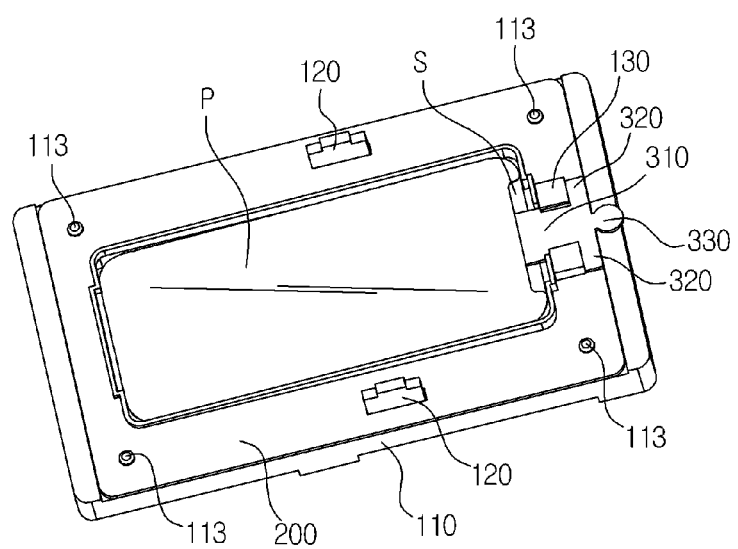
FIG. 5 is a diagram illustrating a state where one side of the display protector is supported by the lifting supporter as a used state in Example.

The lifting supporter 300 is coupled to the coupler 130 as illustrated in FIG. 1 and supports one side of the display protector P so that one side of the display protector P is lifted from the upper surface of the display of the smart device S as illustrated in FIG. 5.

In the exemplary embodiment, as illustrated in FIG. 2, the lifting supporter 300 includes a lifting support body 310 having a flat plate shape, of which the edge is fitted to the coupling groove 132, a stopper 320 provided at both edges of the lifting support body 310 and restricting a moving distance, that is, an insertion depth of the lifting support body 310 as illustrated in FIG. 1, and a handle 330 provided in the lifting support body 310.

The adhesive member injection portion 400 serves to inject the liquid adhesive member into the display of the smart device S received in the receiving groove 111 of the base body 110.

In the exemplary embodiment, the adhesive member injection portion 400 includes a container 410 and a bushing 420 of which the container 410 is coupled to the upper side and the lower side is fitted to the pair of embossed portions 120.

In the container 410 of the adhesive member injection portion 400, the liquid adhesive member, for example, a known liquid adhesive by which the display protector P is attached to the display of the smart device S may be stored.

In the exemplary embodiment, the container 410 may be screw-coupled to the bushing 420.

The bushing 420 of the adhesive member injection portion 400 may be fitted to the pair of embossed portions 120, holes are provided at the center of the bushing 420, and the liquid adhesive member stored in the container 410 may be dropped on the display through the holes of the bushing 420.

Meanwhile, although not illustrated, the exemplary embodiment may further include a curing portion curing the display protector P attached to the display of the smart device S.

In the exemplary embodiment, the curing portion may also cure the display protector P attached to the smart device S using known ultraviolet rays or a known heating means.

Figure 6:
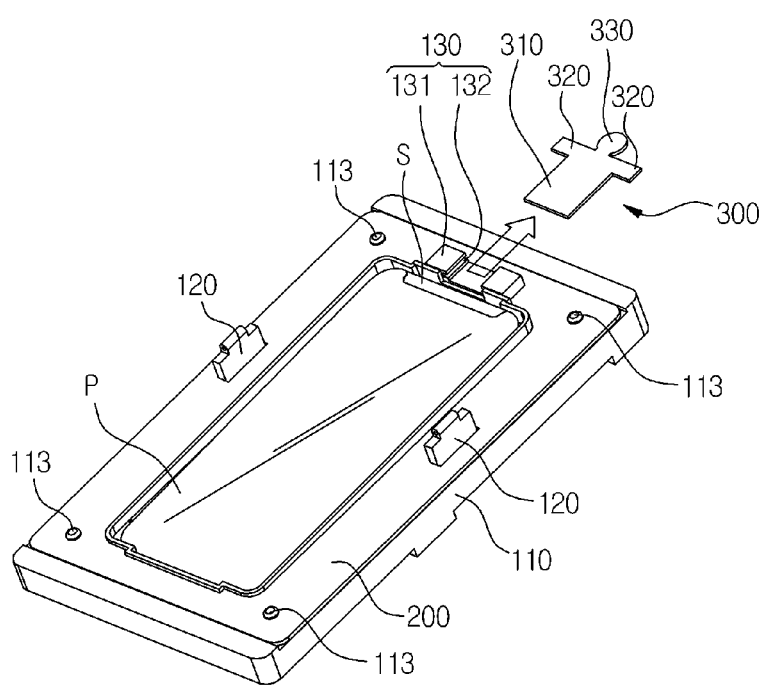
FIG. 6 is a diagram illustrating that the lifting supporter is separated in FIG. 5.

FIG. 4 is a diagram illustrating a state before a display protector is supported by the lifting supporter as a used state in Example, FIG. 5 is a diagram illustrating a state where one side of the display protector is supported by the lifting supporter as a used state in Example, and FIG. 6 is a diagram illustrating that the lifting supporter is separated in FIG. 5.

Hereinafter, a used state in Example will be briefly described with reference to FIGS. 4 to 6.

First, as illustrated in FIG. 4, after the smart device S is received in the base body 110, the lifting supporter 300 is coupled to the coupler 130.

Next, the liquid adhesive member is dropped on the display of the smart device S using the adhesive member injection portion 400 illustrated in FIG. 1.

Next, the display protector P illustrated in FIG. 4 is attached to the display of the smart device S. In this case, one side of the display protector P is supported to be spaced apart from the upper surface of the display of the smart device S by the lifting support body 310 as illustrated in FIG. 5.

Finally, as illustrated in FIG. 6, when the lifting supporter 300 is separated from the coupler 130, the display protector P may be attached to the display of the smart device S while one side of the lifted display protector P is detached from the display. In this case, since the liquid adhesive member on the upper surface of the display is moved to the upper surface of the display while spreading or flowing due to the detachment of the lifting supporter 300 of which one side is supported, bubbles generated while the liquid adhesive member contacts the display protector P may be minimized.

As described above, in the exemplary embodiment, when the lifting supporter is separated from the coupler, the display protector is detached from the display for the smart device placed with a liquid adhesive member to be attached to the display, thereby easily and stably attaching the display protector.

The present invention is not limited to the exemplary embodiments described herein, and it would be apparent to those skilled in the art that various changes and modifications might be made without departing from the spirit and the scope of the present invention. Accordingly, it will be determined that the changed examples or modified examples are included in the appended claims of the present invention.

DESCRIPTION OF REFERENCE NUMERALS

1: Display protector attaching apparatus for smart device
100: Base portion
110: Base body
111: Receiving groove
112: Stepped groove
113: Coupling embossed portion
120: Embossed portion
130: Coupler
131: Coupling body
132: Coupling groove
200: Cover portion
210: Cover body
211: Coupling hole
212: Coupler through hole
213: Embossed through hole
220: Edge portion
230: Cutting portion
300: Lifting supporter
310: Lifting support body
320: Stopper
330: Handle
400: Adhesive member injection portion
410: Container
420: Bushing
P: Display protector
S: Smart device

What is claimed is:

1. A display protector attaching apparatus for a smart device, comprising:
   a base portion provided with a receiving groove in which a smart device is received;
   a cover portion coupled to the base portion to cover the smart device received in the receiving groove; and
   a lifting supporter detachably coupled to a coupler provided in the base portion to support one side of a display protector attached to the smart device,
   wherein the lifting supporter is constructed to separate from the coupler when the display protector is detached from the display of the smart device placed with a liquid adhesive member to be attached to the display, and
   wherein the cover portion comprises:
      a cover body detachably coupled to the upper surface of the base portion wherein the cover body includes an opening hole at the center constructed to receive the display protector; and
      an edge portion provided to protrude upwardly from the edge of the opening hole,
      wherein the edge portion has a cutting portion guiding one side of the lifting supporter coupled to the coupler to enter the opening hole.

2. The display protector attaching apparatus of claim 1, wherein the base portion includes
   a base body provided with the receiving groove; and
   the coupler provided at one side of the base body and detachably coupled with the lifting supporter.

3. The display protector attaching apparatus of claim 2, wherein a stepped groove on which the cover portion is seated is provided on the upper surface of the base body.

4. The display protector attaching apparatus of claim 1, wherein the lifting supporter includes
   a lifting support body detachably coupled to the coupler; and
   a stopper provided in the lifting support body to restrict a moving distance of the lifting support body.

5. The display protector attaching apparatus of claim 4, wherein the lifting supporter further includes a handle provided in the lifting support body.

6. The display protector attaching apparatus of claim 1, further comprising:
   an adhesive member injection portion detachably coupled to the base portion to inject the liquid adhesive member to the display of the smart device received in the receiving groove.

7. An attaching method of a display protector for a smart device, comprising:
   seating a smart device in a receiving groove of a base portion provided with the receiving groove;
   placing a cover portion comprising a cover body on top of the base portion already having the smart device received therein;

dropping a liquid adhesive member on a display of the smart device; and attaching the display protector to the display by separating a lifting supporter detachably coupled to a coupler of the base portion to support one side of the display protector from the coupler, wherein the cover body includes an opening hole at the center constructed to receive the display protector and an edge portion provided to protrude upwardly from the edge of the opening hole.

* * * * *